US006731725B1

(12) United States Patent
Merwin et al.

(10) Patent No.: US 6,731,725 B1
(45) Date of Patent: May 4, 2004

(54) COMPUTERIZED SYSTEM FOR THE RECEIPT, RECORDATION, SCHEDULING AND REDELIVERY OF TELEPHONE MESSAGES

(76) Inventors: Keith A. Merwin, 5110 Siesta Del Rio Dr., Jacksonville, FL (US) 32258; Robert J. van Winkel, 13074 Autumn River Rd., Jacksonville, FL (US) 32224

(*) Notice: Subject to any disclaimer, the term of this patent is extended or adjusted under 35 U.S.C. 154(b) by 0 days.

(21) Appl. No.: 09/605,477

(22) Filed: Jun. 28, 2000

Related U.S. Application Data

(60) Provisional application No. 60/140,946, filed on Jun. 28, 1999.

(51) Int. Cl.[7] ............................................... H04M 1/64
(52) U.S. Cl. ..................... 379/88.23; 379/80; 379/88.01
(58) Field of Search ........................... 379/67.1, 69, 79, 379/80–82, 88.01–88.04, 88.12, 88.16, 88.19–88.25, 214.01, 201.01, 201.02, 201.06

(56) References Cited

U.S. PATENT DOCUMENTS

| | | | | |
|---|---|---|---|---|
| 4,585,906 A | * | 4/1986 | Matthews et al. | 379/69 |
| 4,602,129 A | * | 7/1986 | Matthews et al. | 379/88.26 |
| 4,766,604 A | * | 8/1988 | Axberg | 379/197 |
| 4,941,168 A | * | 7/1990 | Kelly, Jr. | 379/69 |
| 5,075,894 A | * | 12/1991 | Iwase et al. | 379/211.02 |
| 5,206,901 A | * | 4/1993 | Harlow et al. | 379/211.04 |
| 5,241,584 A | * | 8/1993 | Hardy et al. | 379/111 |
| 5,247,568 A | * | 9/1993 | Bergsman et al. | 379/88.23 |
| 5,333,180 A | * | 7/1994 | Brown et al. | 379/79 |
| 5,371,787 A | * | 12/1994 | Hamilton | 379/216.01 |
| 5,404,400 A | * | 4/1995 | Hamilton | 379/172 |
| 5,638,424 A | * | 6/1997 | Denio et al. | 379/88.18 |
| 5,646,982 A | * | 7/1997 | Hogan et al. | 379/88.22 |
| 5,652,789 A | * | 7/1997 | Miner et al. | 379/201.01 |
| 5,991,370 A | * | 11/1999 | Ladd | 379/85 |
| 6,208,970 B1 | * | 3/2001 | Ramanan | 704/270 |
| 6,233,319 B1 | * | 5/2001 | Cox et al. | 379/406.01 |
| 6,269,151 B1 | * | 7/2001 | Hanson | 379/69 |

OTHER PUBLICATIONS

Harry Newton, Newton's Telecom Dictionary, Feb. 2000, Flatiron Publishing, 16th Ed., ISBN 1–57820–053–9, p. 936.*

* cited by examiner

Primary Examiner—Fan Tsang
Assistant Examiner—Roland G Foster
(74) Attorney, Agent, or Firm—Arthur G. Yeager

(57) ABSTRACT

The automated, computerized voice message storage and redelivery system (SRS) provides for the receipt, recordation and storage into individual computer files of telephonic messages received from subscribers who telephone into the computer system and respond either verbally or via touch-tone keypad to verbal prompts by the SRS in order to enter scheduling data and who then record voice message(s) in response to prompts by the SRS. The SRS receives the subscriber's scheduling data and verbal message. The SRS automatically checks its files every minute of every day and, upon detecting a scheduled call telephones the predetermined number. When the recipient telephone is answered, the SRS listens for a human voice. If a human voice is detected, the SRS then replays the previously recorded voice message. If a human voice is not detected, the SRS terminates the telephone call and then does one of two things depending upon the previously recorded request of the subscriber. The SRS redials the predetermined number every three to four minutes until (1) the telephone call is answered and the SRS does detect a human voice and then delivers the previously recorded voice message or (2) the SRS fails on six or more consecutive attempts and then abandons the dialing sequence altogether. Alternatively, the SRS accesses all of the predetermined telephone numbers assigned to the subscriber and then dials each number in cascading fashion until (1) the telephone call is answered and the SRS does detect a human voice whereupon the SRS delivers the previously recorded voice message or (2) the SRS fails on six or more consecutive attempts and then abandons the dialing sequence altogether.

19 Claims, 6 Drawing Sheets

COMPUTERIZED SYSTEM FOR THE RECEIPT, RECORDATION, SCHEDULING AND REDELIVERY OF TELEPHONE MESSAGES

CROSS-REFERENCE TO RELATED APPLICATION

The present application is a continuation of a Provisional Application Ser. No. 60/140,946, Filed Jun. 28, 1999 by the applicants herein.

NOTICE

A portion of the disclosure of this patent document contains material, which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to voice message recordation and redelivery systems, and particularly to those which actively telephone a subscriber and deliver the message to a human recipient rather than to a voice mail or answering machine system.

2. Related Art

A wide variety of message handling systems are known to the prior art. There are also a wide variety of systems that provide for the delivery of messages at predetermined dates and times. Most of these systems, however, do not specifically require the detection of the human voice of the subscriber but simply direct messages to voice mail or answering machines. What is desired is a system designed to specifically locate the subscriber individually and to do so in a relatively simple and inexpensive manner that is fully automated.

BRIEF SUMMARY OF THE INVENTION

In one aspect of the present invention there is provided a method of scheduling and receiving by a user a reminder call from an automated, computerized voice message storage and redelivery system (SRS) comprising the steps of: placing a call from a telephone by the user to the SRS; answering the telephone call placed by a telephone connection of the SRS; identifying by the SRS the user from which the call was made; requesting by the SRS which telephone number is to be called by the SRS to deliver a reminder call; requesting by the SRS the message to be included in the reminder call; recording by the SRS the information obtained pursuant to the above requests; calling the telephone number as requested; if the telephone number is answered, determining by the SRS if a human voice has answered the telephone; and if a human voice answers the telephone, providing by the SRS to the user who answers the telephone with the message.

Further aspects of the present invention include determining by the SRS whether there is a caller identification (CID) number for the telephone used; if a CID number is obtained, comparing by the SRS the CID number obtained to a database of stored CID numbers; and if the CID number matches a stored CID number, requesting when a reminder call is to be made. If a CID number is not obtained, requesting by the SRS from the user a Personal Identification Number (PIN); if a PIN is obtained, comparing by the SRS the PIN obtained to a database of stored PIN's; and if the PIN matches a stored PIN, requesting when a reminder call is to be made including requesting the date and time a reminder call is to be made by the SRS. The SRS also requests more than one telephone number that is to be called; requests the order that the telephone numbers requested are to be called; requests by the SRS that the user enter the user's name; and requests the user speak the user's name.

Additional steps include calling the telephone number on the date and time obtained pursuant to the request. If a human voice is not detected by the SRS, calling the telephone number at time intervals determined by the SRS, including predetermining by the SRS the number of attempts to be made by the SRS to detect a human voice at the telephone number. The SRS also includes the steps of calling the first telephone number in the order obtained pursuant to the request; if the telephone is not answered or if it is not answered by a human voice, calling the second telephone number obtained pursuant to the request; and if the second telephone number obtained is called and is not answered or is not answered by a human voice, calling a third telephone number if one was obtained pursuant to the request. These steps are repeated a predetermined number of times as determined by the SRS and if no number is answered or no number is answered by a human voice, hanging up the SRS telephone connection. The SRS may also provide a predetermined reminder message that may be selected by a user.

In other aspects of the present invention there is provided an automated, computerized voice message storage and redelivery system comprising a computer means for executing software commands, a telephone connection means operatively connected to the computer means for calling and answering a telephone call from a remote location, a voice recognition means operatively connected to the telephone connection means and to the computer means for determining if a telephone called from the telephone connection means has been answered by a human voice, memory means operatively connected to the computer means for storing voice messages received by the telephone connection means from at least one remote telephone and for remembering the number of at least one remote telephone, program means for operating the computer means for receiving, recording, and redelivery of voice messages. The system program means includes means for answering a telephone call by said telephone connection means; means for identifying the user who is making the call; means for requesting when a reminder call is to be made by said system; means for requesting a telephone number to be called to deliver a reminder call; means for requesting the message to be included in the reminder call; means for recording in said memory means the information obtained; means for calling the telephone number as requested; means for determining if the telephone number is answered, and determining by said voice recognition means if a human voice has answered the telephone; and if a human voice is determined to have answered the telephone, providing the user who answers the telephone with the message. The program means includes further means for determining whether there is a caller identification (CID) number for the telephone answered; if a CID number is obtained, comparing the CID number obtained to stored CID numbers in said memory means; and if the CID number matches a stored CID number, proceeding to request when a reminder call is to be made. The program means also includes means for requesting the time and date a reminder call is to be made by the system. The program means further includes means for calling the telephone number on the date and time obtained pursuant to the request.

Additional aspects of the present invention include a method of delivering a scheduled reminder call from an automated, computerized voice message storage and redelivery system (SRS) having the steps of recording by the SRS when a reminder call is to be delivered; recording by the SRS when a reminder call is to be delivered; recording by the SRS at least one telephone number to be called by the SRS to deliver a reminder call; recording by the SRS a message to be included in a reminder call; calling a telephone number recorded when requested; determining by the SRS if a human voice has answered the telephone if the telephone number is answered; and providing by the SRS the user who answers the telephone with the message if a human voice answers the telephone.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

DETAILED DESCRIPTION OF THE INVENTION

Figure 1:
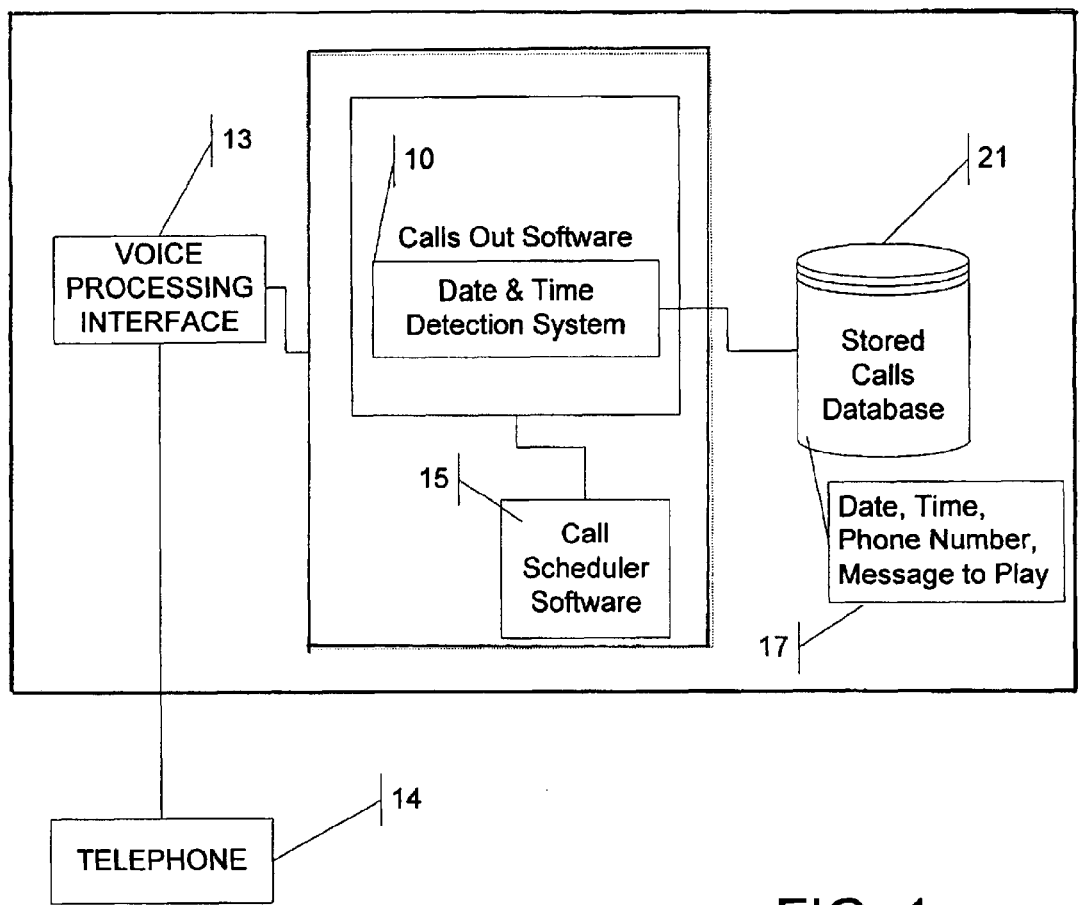
FIG. 1 is a simplified functional block diagram of the date and time detection system in accord with the present invention.

In recent years, telephone users have had available to them an extremely limited number of means by which they can employ their telephones as a means of leaving for themselves reminders or reminder messages which are to be delivered in the future. Of those, none of the automated systems has the ability to contact the user and actively deliver such messages.

At the most basic, level, there are service companies who provide telephone answering services or, in hotels, who provide wake up type messaging. These systems are helpful in their abilities to provide active effort to contact the recipient by telephone in order to deliver the message. However, these Systems are not fully automated. They depend upon a human interaction component in order to connect between the user and the service. As such, they suffer a distinct disadvantage from the present invention which provides the same service on a fully automated system.

Of the automated systems, none have the capacity to automate both the initial contact by the user via telephone and the delivery of the subsequent reminder message, and in so doing, retain the ability to contact the user and actively deliver such messages. For example, a number of voice messaging or voice mail systems have a future delivery option. Automated messaging systems for use with voice mail are known and many telephone companies offer a voice message delivery service under various names. This service allows telephone voice message system subscribers to access an automatic voice message system for callers to leave a message if the subscriber is not answering or if the telephone line is busy.

A voice mail future delivery option allows a person to record a message for himself or herself and then pick a date in the future for the message to be added to the recorded messages that the person checks periodically. Such a message is retrieved when that person takes the active steps of telephoning into the voice mail system, entering a personal identification number, listening to every recorded voice message and finding among them the personal, future delivery message the person left for himself or herself. Depending upon when and how often the voice mail user checks his or her voice mail messages, the future delivery message may or may not be timely. Further, the usefulness of the reminder system remains entirely dependent upon the person to remember to check the voice mail system on a frequent basis. This can be an extremely time consuming process.

Alternatively, a number of cellular and wireless telephones have a small database built into them which allows the owner to calendar the date and time for a reminder tone or beep on his or her telephone, followed by a text message which he or she has previously input. This function is limited by the size of the database, the need for the telephone battery to always have a charge and always be turned on lest a message be missed (a text only message), and the cumbersome process of using the telephone's touchtone keypad in order to "type" in the message in the first instance.

There does exist prior art which addresses the need for timely and active reminder messaging. For example, there are a number of Internet web sites which provide subscribers with reminder emails which are delivered to the subscribers' email address(es) at a predetermined date and time. Examples of these include those web sites named lifeminders; mrwakeup and seeyouonline.

Each of these systems has drawbacks which the present system solves. For example, with the lifeminders system, all reminder messages are recorded into the lifeminders system by the subscriber while sitting at his or her personal computer. Text messages are input and then transmitted to lifeminders via the Internet. At the appropriate date and time, the text message is then redelivered via email to the subscriber at his or her email address. There is no attempt to integrate a telephone reminder feature into the system, and as a result, the utility, timeliness and convenience of the system is significantly undermined by the user's need to be at his or her computer and online in order to both record and later receive the reminder message.

The mrwakeup system provides a partial integration of the telephone utilities available in the present invention. With mrwakeup, reminder messages are recorded into the mrwakeup system by the subscriber while sitting at his or her personal computer. Text messages are input and then transmitted to mrwakeup via the Internet. Subscribers also have an option to record a personal voice message. At the appropriate date and time, the text message is then redelivered via either telephone or email. The mrwakeup telephone application appears to come closer to the present invention. However, the process is a cumbersome one, and, in fact, does not provide a solution to the subscriber's need to be logged onto the Internet. For example, to access the mrwakeup system, the subscriber must be online. The subscriber inputs a request to schedule a telephone reminder voice message at the website and then transmits that request to the provider. The provider then initiates the sequence by telephoning the subscriber and requesting recordation of the message. If, as is often the case, the subscriber's telephone line serves both as a telephone line and as an Internet connection, the subscriber will then be compelled to go offline in order to receive the mrwakeup set up call.

A variant in this field is found in the invention disclosed in U.S. Pat. No. 5,944,786. The system detects when a user has received an e-mail and automatically generates a telephone call to the user to notify him or her that an e-mail has been received. The system does not deliver the e-mail itself, only a notification that e-mail has been received. The automated generation of telephone calls to the user is similar to the manner in which automated telephone calls are generated by the present invention. However, the '786 system does not have any facility for receiving telephone calls from a user and does not claim to be able to deliver reminder messages at a scheduled future time and date.

The present invention provides the following steps:

1. The subscriber places a telephone call to the automated, computerized voice message storage and redelivery system (SRS). The SRS then provides for:
2. Answering the telephone call and initializing data fields to receive the subscriber's data and to calculate the date of the initial call.
3. Retrieving the subscriber's origin telephone number via caller identification, and if available, cross referencing the caller id number against the SRS's database of known and authorized subscribers, and detecting the identity of the caller without the need to prompt the caller for a personal identification number.
4. Greeting the caller by name, if known, or greeting the caller with a request for entry of a personal identification number if the caller is telephoning from an unknown phone number.
5. Cross-checking the personal identification number against its database of known and authorized users and ensuring that the caller is authorized to use the system.
6. Prompting the subscriber to enter via touchtone keypad or voice the date and time that the reminder message is to be delivered to the subscriber in the future, then recording such data and, for purposes of accuracy, reporting to the subscriber the data to be stored.
7. Prompting the subscriber to enter via touchtone keypad voice the telephone number to which the SRS is to direct the reminder message in the future.
8. Prompting the subscriber to record, following a signal tone, the verbal message that he or she wishes to receive in the future and then recording same and saving it to random access memory or allowing the usage of a standard reminder message available in the system.
9. Reinitiating the data collection sequence and prompting the subscriber to record additional reminder calls.
10. Concluding the inbound telephone call session, and then assigning a file name for the voice message and saving the voice message to hard drive, updating an existing date and time file which records and schedules the redelivery of the voice message, checking the date and time file once per minute and, upon detecting a scheduled call, retrieving the file for the appropriate voice message.
11. Telephoning the predetermined telephone number and when the recipient telephone is answered, listening for and detecting a human voice.
12. Upon detecting a human voice, playing an appropriate salutation, replaying the subscriber's previously recorded voice message, and then terminating the outbound telephone sequence.
13. Upon detecting an other than human answer to the outbound telephone call, terminating the outbound telephone call and then doing one of two things depending upon the previously recorded request of the subscriber. The SRS either:
    A. redials the predetermined number every three to four minutes until (1) the telephone call is answered and the SRS does detect a human voice and then delivers the previously recorded voice message or (2) the SRS fails on six or more consecutive attempts and then abandons the dialing sequence altogether; or
    B. accesses all of the predetermined telephone numbers assigned to the subscriber and then dials each number in cascading fashion until (1) the telephone call is answered and the SRS does detect a human voice whereupon the SRS delivers the previously recorded voice message or (2) the SRS fails on six or more consecutive attempts and then abandons the dialing sequence altogether.
14. The SRS also provides a utilities feature by which subscribers can:
    A. customize the performance characteristics of the SRS such that for outbound telephone calls, the SRS will either redial failed calls or turn to the above-mentioned cascading feature;
    B. change their personal identification numbers; or
    C. review and change the predetermined numbers to which the SRS will deliver recorded voice messages.

The automated, computerized voice message storage and redelivery system includes:

A. A computer and telephone interface by which a user may log into the system.
B. An automated sequence of voice prompts seeking, by way of voice and/or touchtone keypad interface with the user, scheduling data received from the user for future delivery of voice messages.
C. A memory storing system by which scheduling data received from subscribers is added to and stored in a computerized scheduling file.
D. An automated system having the capability to:
   i. check the system's scheduling file every minute of every day and, upon detecting a scheduled call, to retrieve the file containing the appropriate voice message,
   ii. to telephone the scheduled telephone number or numbers, to listen for and detect a human voice,
   iii. and upon detecting a human voice, to replay the previously recorded voice message.
E. A human voice detection facility, which instructs the SRS to terminate the outbound telephone call and to either redial the predetermined number at a preset interval until:
   i. the telephone call is answered by a human voice and then deliver the previously recorded voice message; or ii. to detect the system's inability to reach a human voice after six or more consecutive attempts and to then automatically instruct the system to abandon the dialing sequence.

F. A "cascading" device which enables the system:
  i. to access all of the predetermined telephone numbers assigned to the subscriber and
  ii. then dial each number in cascading fashion (i.e., one telephone number after another) until
    (1) the telephone call is answered and the SRS does detect a human voice whereupon the system delivers the previously recorded voice message; or
    (2) the system fails on six or more consecutive attempts and then abandons the dialing sequence altogether.

The data fields to be entered in order to schedule a reminder message are modified such that the subscriber may input date, time and telephone number data via computer interface instead of or in addition to the telephone call.

SYSTEM OPERATION

The present invention is an automated, computerized voice message storage and redelivery system (SRS) that provides for the receipt, recordation, and storage into individual computer files of telephonic messages received from subscribers who telephone into the computer system and respond either verbally or via touch-tone keypad to verbal prompts by the SRS in order to enter scheduling data and who then record voice messages in response to prompts by the SRS. The SRS receives the subscriber's scheduling data and verbal messages and saves the same into random access memory. Once the subscriber has terminated the telephone call session, the SRS assigns a file name for the voice message and saves the message to a hard drive. The SRS then updates an existing date and time file which records and schedules the redelivery of the voice message. The SRS automatically checks the file every minute of every day and, upon detecting a scheduled call, retrieves the file for the appropriate voice message, and telephones the predetermined number. When the recipient telephone is answered, the SRS is designed to listen for and detect a human voice. If a human voice is detected, the SRS then replays the previously recorded voice message. If a human voice is not detected, the SRS terminates the telephone call and then does one of two things depending upon the previously recorded request of the subscriber. The SRS redials the predetermined number every three to four minutes until (1) the telephone call is answered and the SRS does detect a human voice and then delivers the previously recorded voice message or (2) the SRS fails on six or more consecutive attempts and then abandons the dialing sequence altogether. Alternatively, the SRS accesses all of the predetermined telephone numbers assigned to the subscriber and then dials each number in cascading fashion until (1) the telephone call is answered and the SRS does detect a human voice whereupon the SRS delivers the previously recorded voice message or (2) the SRS fails on six or more consecutive attempts and then abandons the dialing sequence altogether.

With respect to the drawings, FIG. 1 illustrates the Date and Time Detection System 10 which constantly checks the Stored Calls Database 21 for calls that need to be processed. If no call is required at this time the system continues to wait. If a call needs to be processed the Call Placement System 12 is started (FIG. 2).

Figure 2:
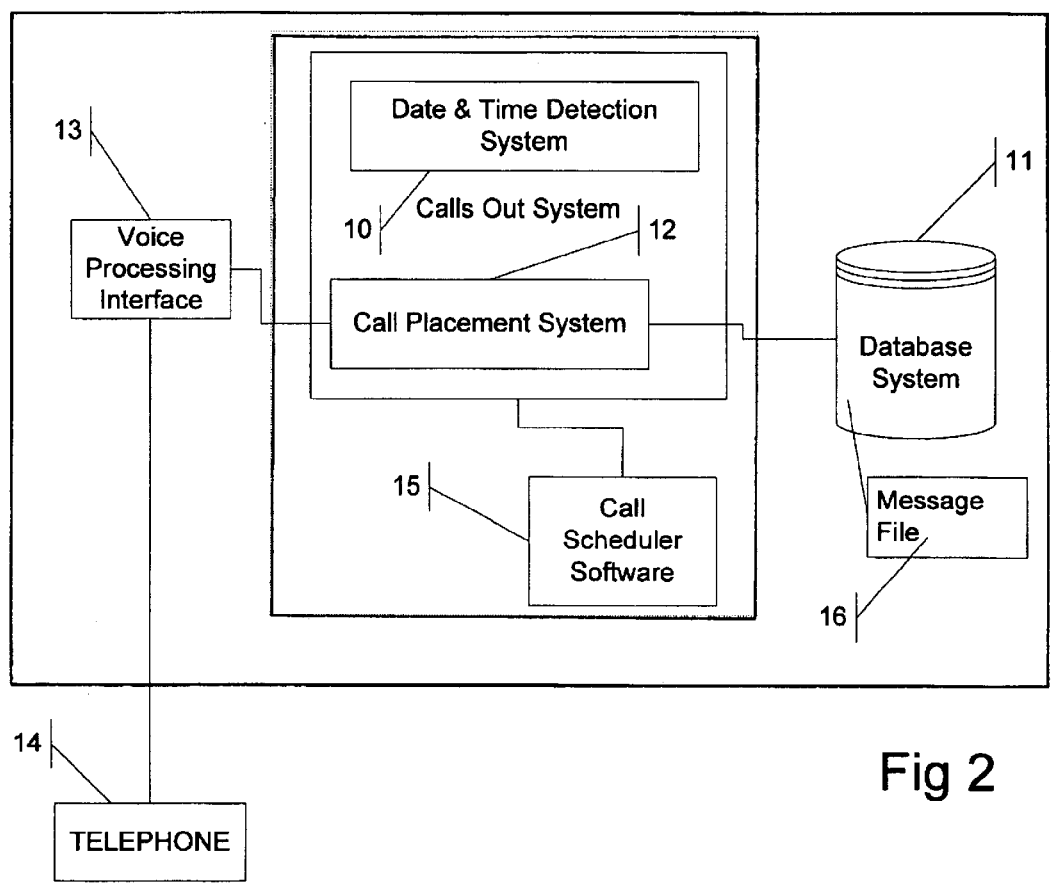
FIG. 2 is a simplified functional block diagram of the call placement system in accord with the present invention.
Figure 3:
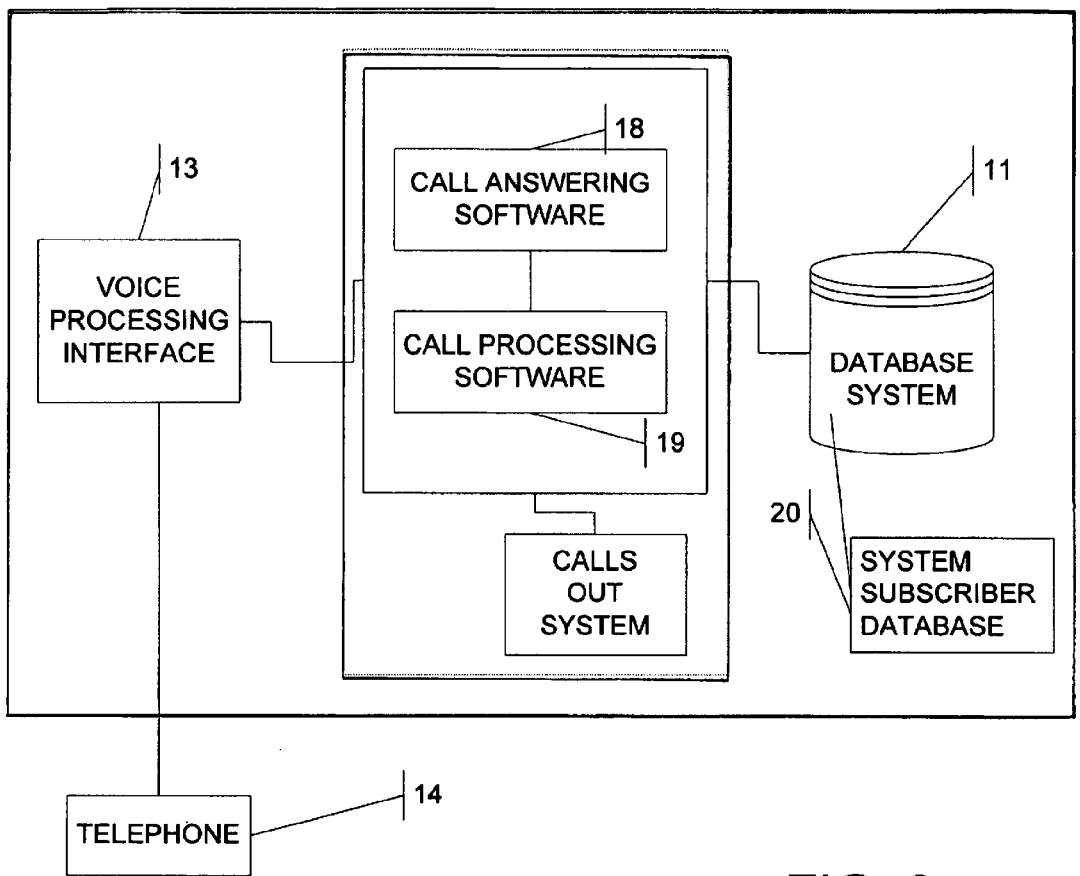
FIGS. 3–5 tare simplified functional block diagrams of the call processing in accord with the present invention.
Figure 4:
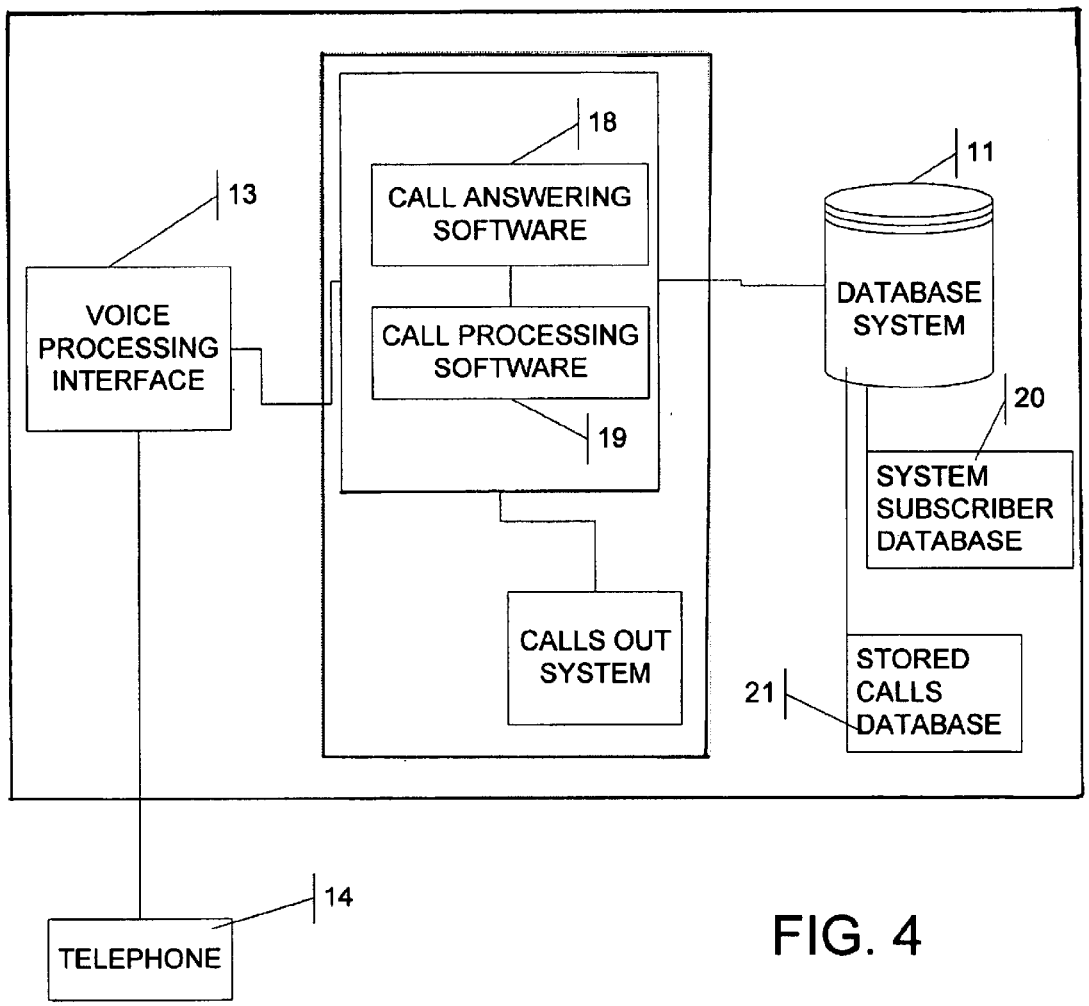
Figure 5:
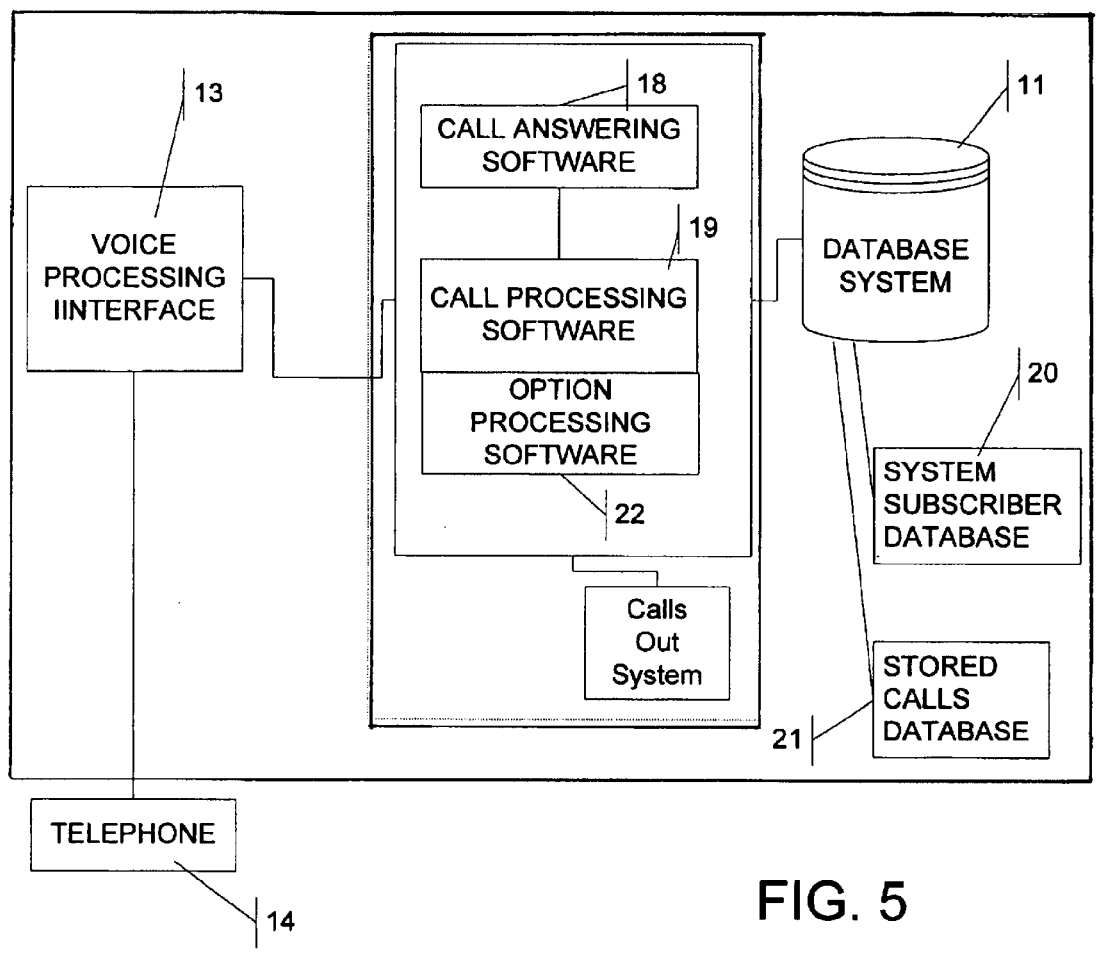

In FIG. 2, the Call Placement System 12 places a call based on the data retrieved from the Call Scheduler Software 15 and the Stored Calls Database 21. When the call is answered by the system subscriber the Call Placement System 12 retrieves the custom recorded message 17 from file 16 from the Database System 11 and plays the recording for the system subscriber. The Call Placement System 12 then hangs up the call and deletes the recording file. In FIG. 3, the system answers the telephone 14 and the Voice Processing Interface 13 provides the Call Answering Software 18 with the caller identification information from the telephone service provider, if this information is not available the Call Answering Software 18 requests the caller's Personal Identification Number. Using this information, the caller's subscription data is retrieved from the System Subscriber Database 20. If the subscriber cannot be identified the system asks for the caller's Personal Identification Number (PIN). After identifying the caller as a subscriber the system plays the subscriber's stored name recording. In FIG. 4 the Call Processing Software 19 now collects from the caller the data needed in order to process the reminder call. The system first requests from the caller the date of the reminder call and then asks the caller if the entered data is correct. The time for the reminder call is requested next and verified in the same manner. Then the system asks the caller to select which of their stored telephone number(s) the reminder call should be made to. Once all the data for the reminder call has been collected the Call Processing Software 19 stores the reminder call in the Stored Calls Database 21 and informs the caller that the call is stored. The caller may now hang up to complete the process or select one or more available options from a menu. In FIG. 5 if the caller continues the call, the Option Processing Software 22 plays the Option Menu to the caller. The caller can then select to begin the process over and create a different reminder message, or edit the database entries stored concerning information such as the Subscriber's Personal Identification Number or Recorded Name. If the caller selects to edit any of these fields the system will request the needed information, verify the changes with the caller and store the changes in the appropriate database system.

Figure 6:
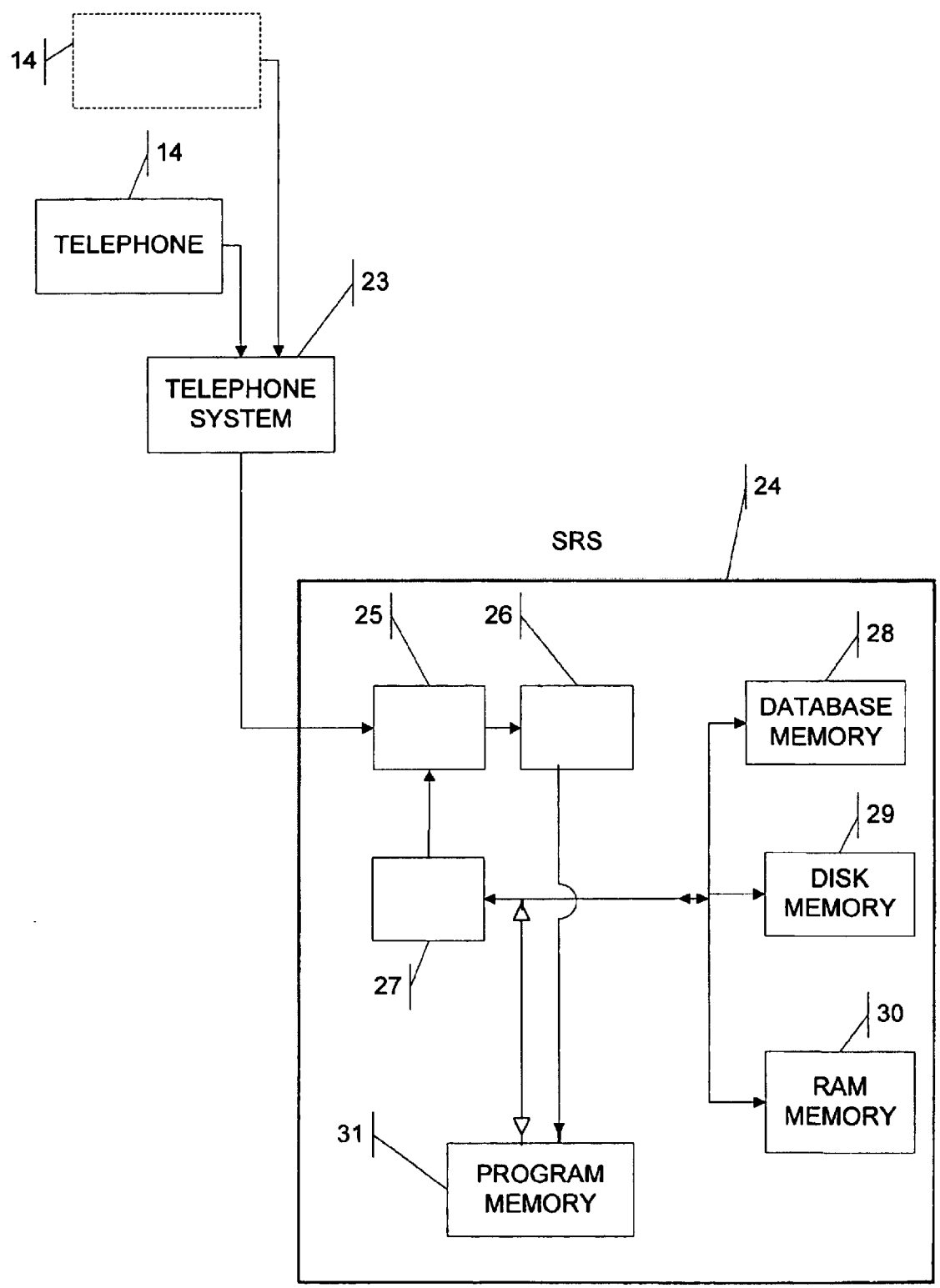
FIG. 6 is a simplified block diagram of the automated computerized voice message storage and redelivery system in accord with the present invention.

A simplified block diagram of an implementation of the present invention is shown in FIG. 6. A touch-tone telephone 14 is one of many phones that are connected to a standard telephone system 23. The present system and method is contained in the computer-based SRS 24, which includes a telephone connection circuit 25 and a voice recognition circuit 26. The outbound message circuitry 27 routes recorded messages and prompts to a telephone 14. Databases memory 28, hard drive memory 29 and RAM 30 are standard as understood in the art. Schedule call and reminder call software is loaded into memory 31 which may be of any time as understood in the art. Date and Time are provided by a real time clock and calendar.

The particular implementation of the present invention can vary widely depending upon cost and other factors as understood in the art. For example, user identification can be accomplished through the use of voice identification and comparison technology in lieu of PIN's or in addition thereto.

A description of the "schedule call" programming is attached as appendix A (16 pages). A description of the "reminder call" programming is attached as Appendix B (5 pages). Appendix C (5 pages) is simplified flow charts for "schedule call" and Appendix D (1 page) is a simplified flow chart for the "reminder call" function.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method of scheduling and receiving by a user reminder call from an automated, computerized voice message storage and redelivery system (SRS) that includes a database containing previously stored identification information from a user to define the user as a subscriber and a human voice recognition means for determining if a human voice answers a call placed by the SRS or some other means was utilized to answer the call comprising the steps of:
   A. placing a call from a telephone by the user to the SRS;
   B. answering the telephone call placed in step A by a telephone connection of the SRS;
   C. identifying by the SRS the user from which the call of step A was made;
   D. requesting by the SRS when a reminder call is to be made by the SRS to the user;
   E. requesting by the SRS which telephone number is to be called by the SRS to deliver the reminder call of step D;
   F. requesting by the SRS the message to be included in the reminder call of step D;
   G. recording by the SRS the information obtained pursuant to the requests of the steps D, E, and F;
   H. calling the telephone number of step E as requested in step D;
   I. if the telephone number of step H is answered, determining by the voice recognition means of the SRS if a human voice has answered the telephone or the telephone is answered by means other than a human voice; and
   J. if a human voice answers the telephone of step H, providing by the SRS to the user who answers the telephone with the message of step F;
   K. determining by the SRS whether there is a caller identification (CID) number for the telephone used in step A;
   L. if a CID number is obtained in step K, comparing by the SRS the CID number obtained in step K to a database of stored CID numbers; and
   M. if the CID number of step K matches a stored CID number in step L, proceeding with step D.

2. The method of claim 1 wherein step L includes the steps of:
   N. if a CID number is not obtained in step K or the telephone number is unknown to the SRS, requesting by the SRS from the user a Personal Identification Number (PIN);
   O. if a PIN is obtained in step N, comparing by the SRS the PIN obtained in step N to a database of stored PIN's; and
   P. if the PIN of step N matches a stored PIN in step O, proceeding with step D.

3. The method of claim 1 wherein step D includes the step of:
   N. requesting the date a reminder call is to be made by the SRS.

4. The method of claim 3 wherein step D further includes the step of:
   O. requesting the time a reminder call is to be made by the SRS.

5. The method of claim 1 wherein step E includes the step of:
   N. requesting by the SRS more than one telephone number that is to be called.

6. The method of claim 5 further includes the step of:
   O. requesting by the SRS the order that the telephone numbers requested in step K are to be called.

7. The method of claim 1 wherein step C includes the step of:
   N. requesting the user speak the user's name.

8. The method of claim 7 wherein step K includes the step of:
   O. requesting the user speak the user's name.

9. The method of claim 4 further including the step of:
   P. calling the telephone number of step H on the date obtained pursuant to the request of step N and at the time obtained pursuant to the request of step O.

10. The method of claim 9 wherein step P includes the step of:
    Q. if a human voice is not detected by the SRS in step I, calling the telephone number of step E at timer intervals determined by the SRS.

11. The method of claim 10 wherein step Q includes the step of:
    R. predetermining by the SRS the number of attempts to be made by the SRS to detect a human voice at the telephone number called in step Q.

12. The method of claim 6 wherein step E includes the steps of:
    P. calling the first telephone number in the order obtained pursuant to the request of step O;
    Q. if the telephone is not answered or if it is not answered by a human voice, calling the second telephone number obtained pursuant to the request of step O; and
    R. if the second telephone number obtained is called and is not answered or is not answered by a human voice, calling a third telephone number if one was obtained pursuant to the request of step O.

13. The method of claim 12 further including the steps of:
    S. repeating steps P, Q, and R a predetermined number of times as determined by the SRS and if no number is answered or no number is answered by a human voice, terminating steps P, Q, and R; and
    T. hanging up the SRS telephone connection.

14. The method of claim 1 wherein step F includes the step of:
    N. providing by the SRS a predetermined reminder message that may be selected by a user.

15. An automated, computerized voice message storage and redelivery system comprising a computer means for executing software commands, a database for storing previously acquired identification information from a user a telephone connection means operatively connected to said computer means for calling and answering a telephone call from a remote location, a human voice recognition means operatively connected to said telephone connection means and to said computer means for determining if a telephone called from said telephone connection means has been answered by a human voice or answered by means other than a human voice, memory means operatively connected to said computer means for storing voice messages received by said telephone connection means from at least one remote telephone and for remembering the number of at least one remote telephone, said program means includes:
    A. means for answering a telephone call by said telephone connection means;

B. means for identifying the user who is making the call;

C. means for requesting when a reminder call is to be made by said system;

D. means for requesting a telephone to be called to deliver a reminder call;

E. means for requesting the message to be included in the reminder call;

F. means for recording in said memory means the information obtained pursuant to the requests of said means of C, D, and E;

G. means for calling the telephone number of said means of D as requested in said means of C;

H. means for determining if the telephone having the number of said means of G is answered, determining by said means for detecting and differentiating if an unrecorded human voice has answered the telephone or the telephone is answered by means other than an unrecorded human voice;

I. if an unrecorded human voice answers the telephone of said means of G for providing the user who answers the telephone with the message of said means of F.

J. means for determining whether there is a caller identification (CID) number for the telephone answered in said means of A;

K. means for determining if a CID number is obtained in said means of J, for comparing the CID number obtained in said means of J to stored CID numbers in said memory means; and L. means for determining if the CID number of said means of J matches a stored CID number in said means of K for proceeding with said means of C.

16. The system as defined in claim 15 wherein said program means further includes:

M. means for requesting the time and date a reminder call is to be made by said system.

17. The system as defined in claim 16 wherein said program means includes:

N. means for calling the telephone number of said means of G on the date and time obtained pursuant to the request of said means of M.

18. A method of delivering a scheduled reminder call from an automated, computerized voice message storage and redelivery system (SRS) that includes a database containing previously stored identification information from a user to define the user as a subscriber and a human voice recognition means for determining if a human voice answers a call placed by the SRS or some other means was utilized to answer the call comprising the steps of:

A. recording by the SRS when a reminder call is to be delivered;

B. recording by the SRS at least one telephone number to be called by the SRS to deliver a reminder call;

C. recording by the SRS a message to be included in a reminder call;

D. calling a telephone number recorded in step B when requested in step A;

E. determining by the SRS if a human voice has answered the telephone if the telephone number of step D is answered or whether the telephone number of step D is answered by other than a human voice;

F. providing by the SRS the user who answers the telephone with the message of step C if a human voice answers the telephone of step D;

G. determining by the SRS whether there is a caller identification (CID) number for the telephone used in step A;

H. if a CID number is obtained in step G comparing by the SRS the CID number obtained in step G to a database of stored CID numbers; and I. if the CID number of step G matches a stored CID number in step H proceeding with step D.

19. A method of scheduling and receiving by a user reminder call from an automated, computerized voice message storage and redelivery system (SRS) that includes a database containing previously stored identification information from a user to define the user as a subscriber and a means for detecting and differentiating and unrecorded human voice answering a telephone call placed by the SRS from calls answered by other means answering calls from the SRS comprising the steps of:

A. placing a call from a telephone by the user to the SRS;

B. answering the telephone call placed in step A by a telephone connection of the SRS;

C. identifying by the SRS the user from which the call of step A was made;

D. requesting by the SRS when a reminder call is to be made by the SRS to the user;

E. requesting by the SRS which telephone number is to be called by the SRS to deliver the reminder call of step D;

F. requesting by the SRS the message to be included in the reminder call of step D;

G. recording by the SRS the information obtained pursuant to the requests of the steps D, E, and F;

H. calling the telephone number of step E as requested in step D;

I. if the telephone having the number of step H, is answered, determining by the means for detecting and differentiating if an unrecorded human voice has answered the telephone or the telephone is answered by means other than an unrecorded human voice;

J. if an unrecorded human voice answers the telephone of step H, providing by the SRS to the user who answers the telephone with the message of step F;

K. If the telephone number is unknown to the SRS or no caller identification (CID) number is provided by the telephone used in step A, requesting by the SRS from the user a Personal Identification Number (PIN);

L. if a PIN is obtained in step K, comparing by the SRS the PIN obtained in step K to a database of stored PIN's; and M. if the PIN of step K matches a stored PIN in step L proceeding with step D.

* * * * *